Aug. 9, 1960
W. H. C. NESS
2,948,798
MOBILE HOT AND COLD FOOD CART
Filed Oct. 17, 1958
2 Sheets-Sheet 1
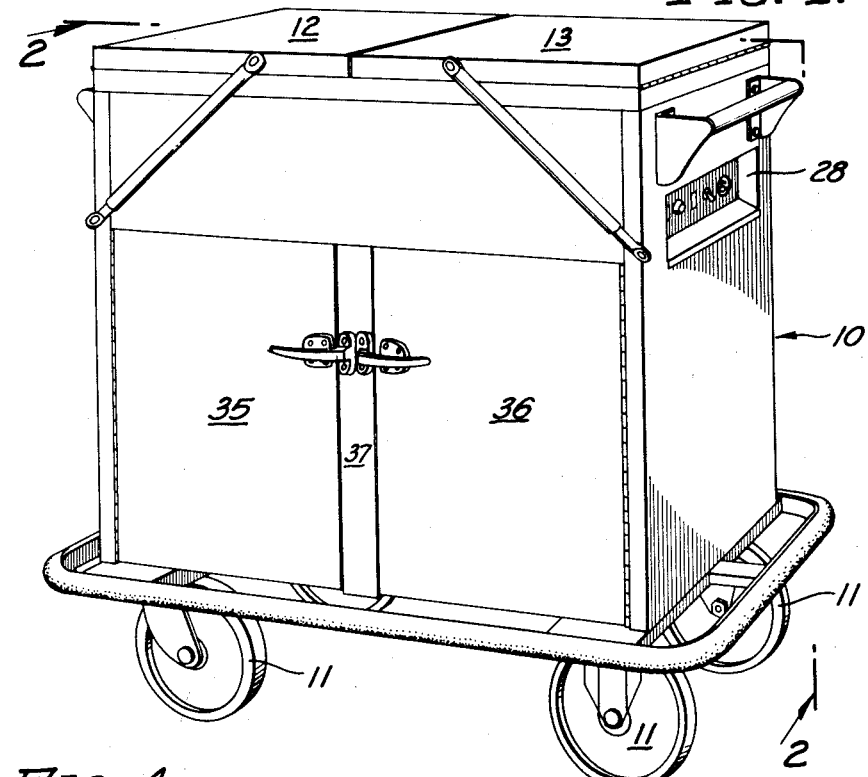
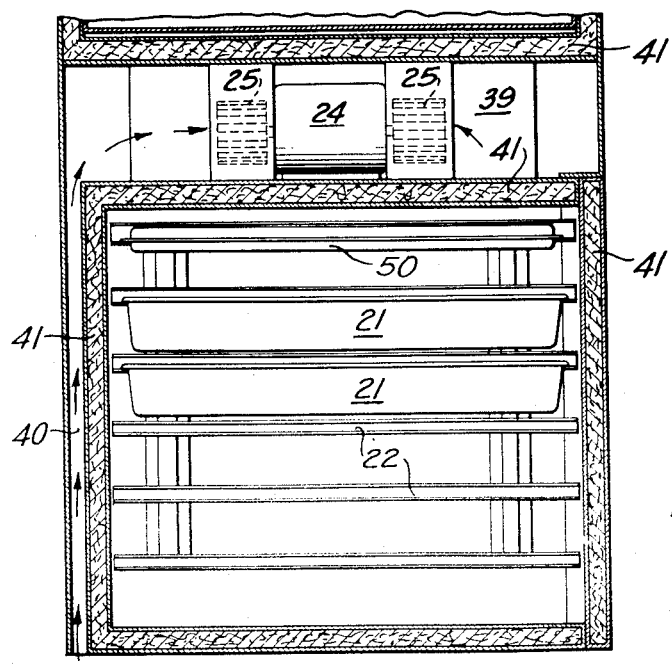
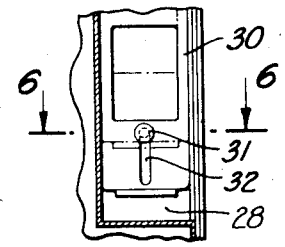
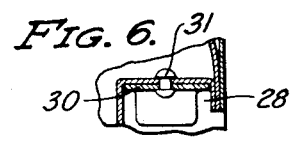
INVENTOR
WILLIAM H. C. NESS
BY
Robert C. Comstock
ATTORNEY

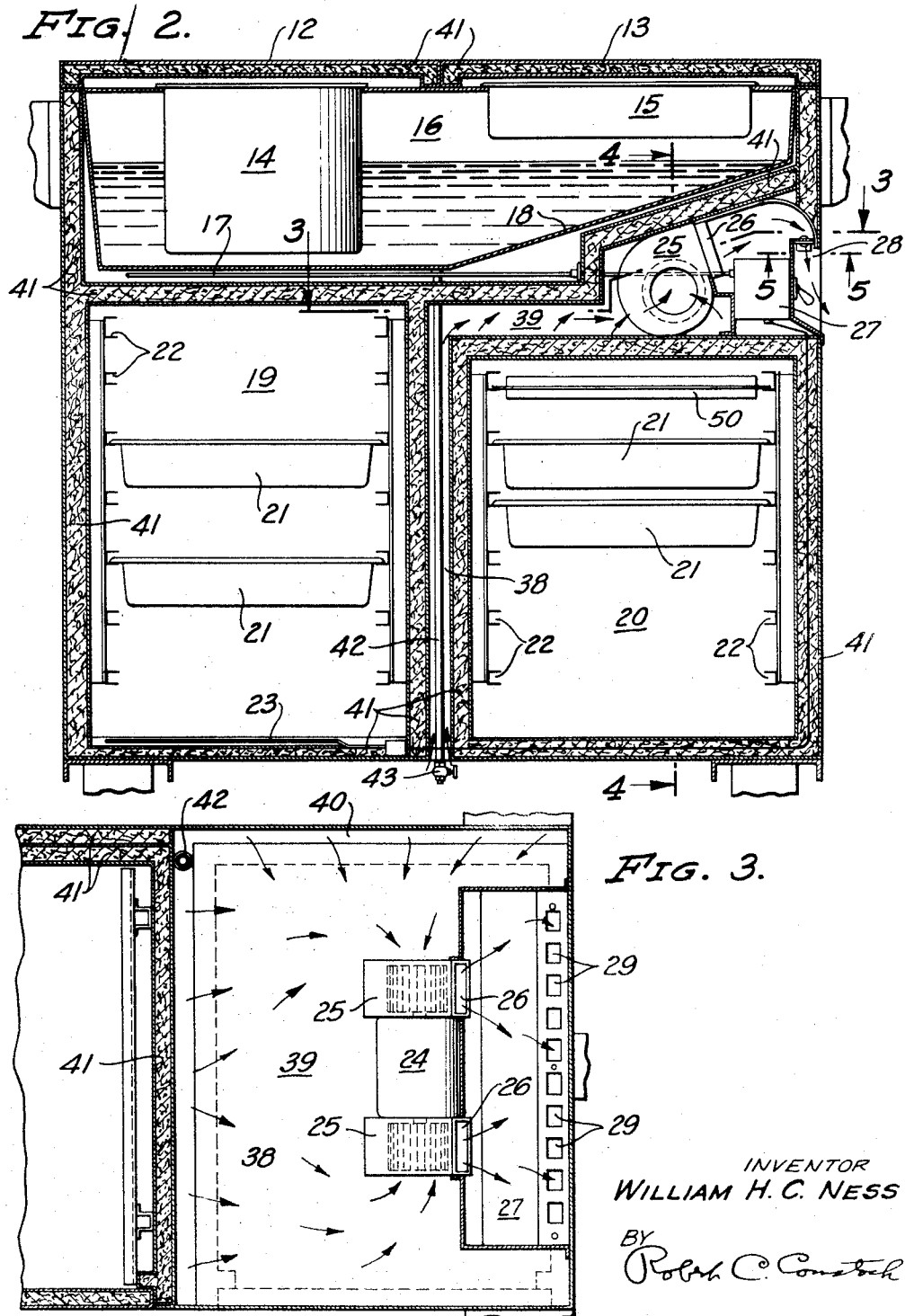

United States Patent Office 2,948,798
Patented Aug. 9, 1960

2,948,798

MOBILE HOT AND COLD FOOD CART

William H. C. Ness, Los Angeles, Calif., assignor to National Cornice Works, Los Angeles, Calif., a corporation of California Filed Oct. 17, 1958, Ser. No. 767,912

1 Claim. (Cl. 219—19)

This invention relates to a mobile food cart for storing and transporting hot and cold food in a common conveyance or container, which embodies means for preventing the heat of the hot food section from being transmitted to the cold food.

It is the primary object of my invention to provide a mobile food cart which has at least one hot food compartment and an adjacent cold food compartment within a single cabinet, and in which the cold food compartment is effectively protected against heat radiated or transmitted from the hot food compartment or compartments and their heating means.

A more particular object of my invention is to insulate and protect the cold food compartment from the hot food compartment and heating means by providing protective air spaces which surround the cold food compartment, through which spaces air is moved to dissipate heat radiated or conducted from the hot food compartment and heating means.

It is a further object of my invention to provide a cart which incorporates the structure described without changing the normal appearance of the cart and without the user being particularly aware of the means utilized to protect the cold food compartment.

Another object of my invention is to provide a cart of the class described in which the electrical wiring and controls required to operate the food heating means are protected from dampness and from overheating.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings.

Fig. 1 is a perspective view of a closed food cart embodying my invention;

Fig. 2 is a sectional view of the same taken along line 2—2 of Fig. 1;

Fig. 3 is a sectional view of the cold food compartment taken along line 3—3 of Fig. 2;

Fig. 4 is another sectional view of the cold food compartment taken along line 4—4 of Fig. 3;

Fig. 5 is an enlarged sectional view of the air outlet assembly taken along line 5—5 of Fig. 3;

Fig. 6 is a sectional view of the same taken along line 6—6 of Fig. 5.

A preferred embodiment which has been selected to illustrate my invention comprises a cart 10, which is mounted on a plurality of wheels 11. The top of the cart 10 is provided with a pair of hinged covers 12 and 13, beneath which are suspended a deep pan 14 and a shallower tray 15. The upper portion of the cart 10 comprises a water receiving basin 16, which is adapted to hold hot water for the purpose of heating food contained in the pan 14 and tray 15. An electrically operated heating element 17 is disposed beneath the basin 16. The end of the basin 16 beneath the tray 15 is provided with a slanted floor 18.

The lower portion of the cart 10 is divided into two adjacent compartments. One is a hot food compartment 19 and the other is a cold food compartment 20. Each of the compartments is provided with a plurality of removable trays 21, which are suspended by their rims from tracks 22 which extend along the sides of the compartments. An electrically operated heating element 23 is disposed beneath the hot food compartment 19.

Mounted directly above the cold food compartment 20 is an electrically operated motor 24, which is disposed between and operates a pair of rotating fans 25. Air is adapted to enter the opposite sides of the fans 25 and be directed out through discharge vents 26 which are directed toward the adjacent side of the cart 10.

An electrical control box 27 is disposed directly adjacent to the fans 25. The box 27 holds the electrical controls, switches and wiring required to operate the heating elements 17 and 23 and the motor 24. The side of the cart 10 adjacent to the box 27 is provided with an inwardly directed recess 28. The top of the recess 28 extends at a right angle to the side of the cart 10 and is provided with a plurality of spaced rectangular air outlets 29. A damper 30 is slidably mounted by one or more pins 31 having shanks disposed within slots 32. The damper 30 can be moved longitudinally with respect to the air outlets 29 in order to partially close off the outlets 29, if desired.

The front of the cart is provided with a pair of hinged doors 35 and 36, which extend across the front of the hot and cold food compartments 19 and 20 respectively. A vertically directed panel 37 is disposed between the doors 35 and 36. An air space 38 extends transversely across the cart 10 from behind the panel 37 to the back of the cart 10. This air space 38 is open along its entire bottom edge, so that air can enter it from beneath the cart 10. The entire upper edge of the air space 38 connects with a horizontally directed air space 39 which extends across the upper surface of the cold food compartment 20.

A third air space 40 extends upwardly from the bottom of the cart 10 across the entire back side of the cold food compartment 20. The bottom edge of the air space 40 is open and the upper edge connects with the air space 39. The result is that the cold food compartment 20 is substantially surrounded by the air spaces 38, 39 and 40.

Each of the hot and cold food compartments 19 and 20 is insulated all around with suitable insulation material 41. This insulation also extends around the upper hot water basin 16. A drainpipe 42 extends downwardly from the basin 16 through the air space 38 to the bottom of the cart 10, where it is provided with a drain cock 43 for removing water from the basin 16.

In use, it is customary to place water in the basin 16, which water is heated by the heating element 17 in order to keep food warm in the pan 14 and tray 15. Hot food is placed in trays 21, which are stored in the hot food compartment 19 and kept warm by the heating element 23. Cold food is placed in trays 21, which are stored in the cold food compartment 20. The cart 10 is customarily connected to a suitable source of electrical supply while the food is being placed in it and before it is moved. It is disconnected temporarily while the cart is moved to the desired location for serving. It is then connected to another suitable electrical outlet.

In order to keep the cold food from being heated by heat from the hot food compartment 19, basin 16 and heating elements 17 and 23, room temperature air is continuously drawn into and moved through the air spaces 38, 39 and 40 which surround the cold food compartment 20. The heated air within the air spaces 38–40 is moved out and replaced by air of room temperature through operation of the motor 24 and fans 25, which draw room temperature air into the air spaces 38 and 40 from the bottom of the cart 10 and move it past the sides and top of the cold food compartment 20 and then into the fans 25. The air which is drawn into the fans 25 is discharged from the vents 26 past the electrical control box 27 and through the air outlets 29 into the recess 28 and out into the atmosphere.

The room temperature air which moves through the air spaces 38–40 carries away all of the heat radiated or conducted by the walls on the hot food compartment 19 and basin 16 and by the heating elements 17 and 23 and thus protects the cold food which is stored within the cold food compartment 20.

The recess 28 serves a dual purpose. First, it provides a convenient concealed outlet for the air. Second, it protects the electrical controls within and on the front of the control box 27 from water or moisture used while cleaning.

The placement of the electrical control box 27 between the discharge vents 26 and the air outlets 29 permits the fans 25 to circulate the air past the electrical control box 27. This circulating air acts to carry off heat from the control box 27 to prevent the electrical wiring and controls from becoming overheated.

In order to maintain a low temperature within the cold food compartment 20, a eutectic plate 50 may be mounted on the top tracks 22. The eutectic plate 50 has several times the cooling capacity of ice, without the discharge of any water.

The damper 30 may be used to control the flow of the circulated air. By varying the relative sizes of the damper and air outlets 29, it is also possible to completely close off the air outlets 29. This may be desirable if hot food is placed in the cold food compartment 20.

While the use of an electrically operated fan is believed to be preferable for effective continuous circulation of air through the passages 38–40, it should be noted that a certain amount of circulation of air will take place without the use of a fan due to heat convection currents. It is accordingly possible to omit the fan and still provide effective insulation of the cold food compartment.

In the preferred embodiment shown in the drawings, the cold food compartment has a hot food compartment on only one side thereof. If there were hot food compartments on both sides, air passages would, of course, be disposed on both sides of the cold food compartment in order to insulate it from both of the hot food compartments.

I claim:

A hot and cold food cart having a hot food compartment and a cold food compartment disposed side by side, an electrically operated heating member disposed beneath said hot food compartment, an electrically operated fan disposed above said cold food compartment, an electrical control box disposed between said fan and one side of said cart, a side air passage extending across the entire side of said cold food compartment which is adjacent to said hot food compartment, a back air passage extending across the entire back of said cold food compartment, said air passages extending from the bottom of said cold food compartment to the top thereof, a top air passage extending across the entire top of said cold food compartment, the side of said cart adjacent to said control box having a recess extending inwardly from the side of said cart to the front of said control box, the top of said recess being substantially horizontal, a plurality of air outlets formed in the top of said recess, air directing means carried by said fan to direct air from said top air passage past the top of said control box and out through said air outlets past the front of said control box, the movement of air out of said top air passage causing air to be circulated from beneath said cart through said side and back air passages into said top air passage to insulate said cold food compartment and to cool and dry said control box.

References Cited in the file of this patent

UNITED STATES PATENTS

| | | |
|---|---|---|
| 1,727,395 | Coffey | Sept. 10, 1929 |
| 1,734,466 | Hoke et al. | Nov. 5, 1929 |
| 1,941,832 | Gottfried | Jan. 2, 1934 |
| 2,309,513 | Kramer | Jan. 26, 1943 |
| 2,627,445 | Lyon | Feb. 3, 1953 |
| 2,836,114 | Weaver et al. | May 27, 1958 |
| 2,845,780 | Conklin et al. | Aug. 5, 1958 |

FOREIGN PATENTS

| | | |
|---|---|---|
| 471,503 | Great Britain | Dec. 3, 1935 |